Feb. 8, 1927.

J. J. KASTNER 1,617,120

CULINARY UTENSIL

Filed June 25, 1925

Inventor
James J. Kastner
By Bryant & Lowry
Attorneys

Patented Feb. 8, 1927.

1,617,120

UNITED STATES PATENT OFFICE.

JAMES J. KASTNER, OF CHICAGO, ILLINOIS.

CULINARY UTENSIL.

Application filed June 25, 1925. Serial No. 39,513.

This invention relates to new and useful improvements in a culinary utensil.

The primary object of the invention is to provide a utensil which may be used in connection with culinary vessels for preventing the food being cooked therein from being burned and for preventing water from boiling over when being heated in said vessels.

Other objects and advantages of the invention will be apparent during the course of the following description.

Figure 1:
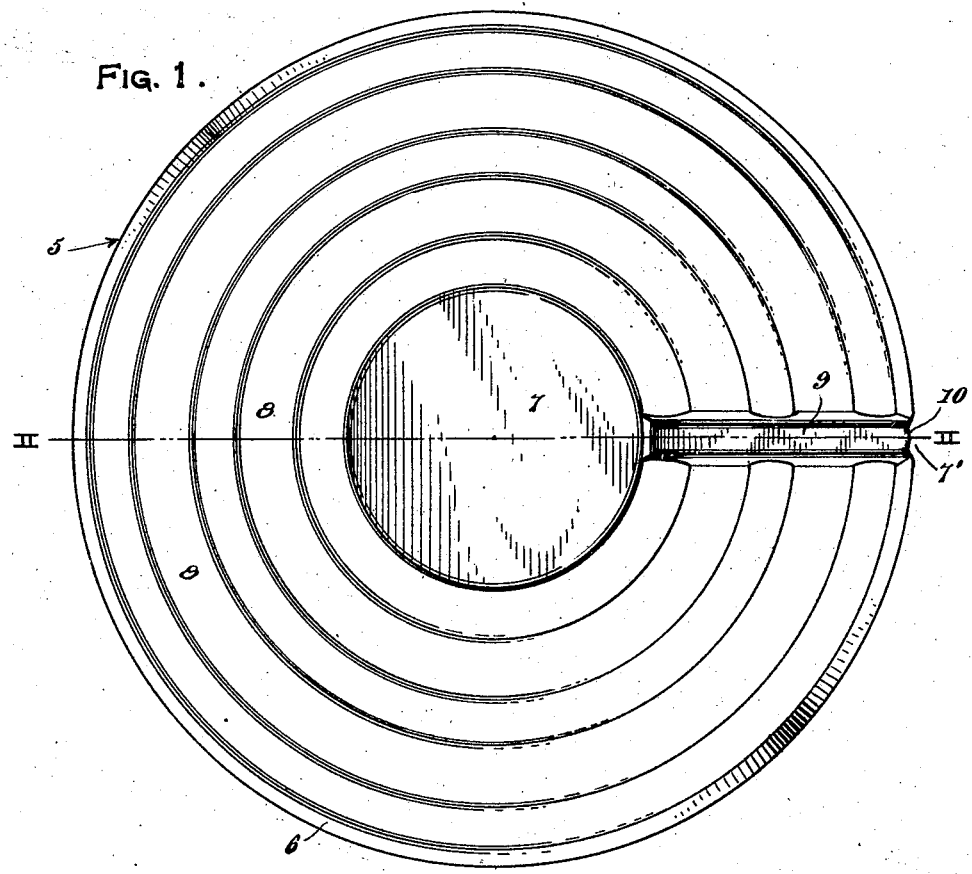
Figure 2:
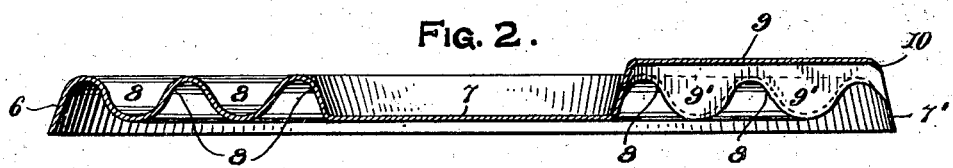
Figure 3:
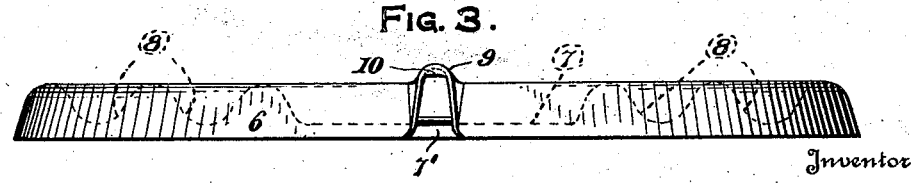
Figure 4:
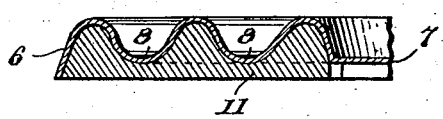

In the accompanying drawing forming a part of this specification and in which like numerals are employed to designate like parts throughout the same, Figure 1 is a top plan view of the culinary utensil embodying this invention, Figure 2 is a vertical sectional view taken upon line II—II of Fig. 1, Figure 3 is an edge elevational view of the utensil shown in Figs. 1 and 2, and Figure 4 is a fragmentary portion of a modified form of utensil and shown in vertical section which is taken upon the same section line as the showing in Fig. 2.

In the drawing, wherein for the purpose of illustration is shown the preferred embodiment of this invention, the numeral 5 designates the utensil in its entirety, as shown in Figs. 1 to 3 inclusive, which is of substantially disk formation and has the depending, downwardly flaring edge flange 6 which is broken at 7', see Figs. 2 and 3. The main body portion of this disk-like utensil is provided with the centrally arranged, cup-like depression 7 which is surrounded by the concentric corrugations including the grooves 8, as shown.

Extending radially from the cup-like depression 7 to the point where the side flange 6 is broken away at 7', is a rib 9 which is raised above the top plane of the body portion of the utensil and terminates at its outer end in a downwardly extending lip 10. This rib 9 is stamped from the material from which the utensil is formed and thereby closes the ends of the upper grooves 8 by means of its side walls 9'.

It will be seen by inspecting Figs. 2 and 3 that the edge of the flange 6 terminates below the bottom plane of the body portion of the utensil and thereby maintains the said body portion elevated from any surface upon which the utensil is placed.

This device is intended to be employed for preventing the burning of food while being cooked in a culinary vessel. To perform this function, the utensil is placed in the bottom of the vessel and the food arranged thereupon. This maintaining of the food elevated from the bottom of the vessel will prevent the said food from burning in a well known manner. A further utility for the utensil is to prevent water from boiling over while being heated in a culinary vessel. In performing this function, the utensil is placed on the bottom of the vessel, as described above, and as the water starts to boil or even while it is boiling, air bubbles will rise from the bottom of the vessel to escape from the surface of the water being heated. The air bubbles starting from the bottom of the vessel beneath the utensil will exert an upward pressure against the bottom of the utensil and will cause the latter to vibrate or bob up and down. These bubbles will eventually escape from beneath the utensil by way of the groove formed beneath the rib 9 and the broken away point 7' in the edge flange 6. This agitating of the utensil will prevent the water from boiling over.

In Fig. 4 there is shown a slightly modified form of utensil which includes the positioning of a weight or slug 11 beneath the utensil at a point diametrically opposite the rib 9 and the radial groove formed beneath the same. This weight or slug 11 is preferably in the form of a radially extending strip and is intended to function to cause the air bubbles rising from the bottom of the vessel and beneath the utensil to travel around the underneath groove 8 in opposite directions until the said bubbles arrive at the groove formed by the underneath portion of the rib 9 when they will be permitted to escape to the broken away portion 7' of the side flange 6. The provision of a weight at a point diametrically opposite the opening 7' in the flange 6 will cause this side of the utensil to remain in engagement with the bottom of the vessel at its outer edge, or at the lower edge of the side flange 6. The escaping bubbles of air, however, will cause the side of the utensil having the rib 9 formed therein to rise and fall in the same manner as described in connection with the entire utensil shown in Figs. 1 to 3 inclusive.

It is to be understood that the forms of this invention herewith shown and described are to be taken as preferred examples of the same, and that various changes in the shape, size, and arrangement of parts may be resorted to without departing from the spirit of the invention or the scope of the subjoined claim.

Having thus described the invention, I claim:—

In a culinary utensil, a disk-like body portion having concentric corrugations formed therein, an edge flange formed on said body portion and depending below the bottom plane of the latter, a radial rib formed in the body portion and opening outwardly through said edge flange, and a radially extending strip-like weight connected to the underface of the body portion and to the edge flange at a point arranged diametrically opposite the said radial rib, the upper face of the strip being undulated for intimate contact with the concentric corrugations of the body portion.

In testimony whereof I affix my signature.

JAMES J. KASTNER.